Sept. 24, 1957 R. W. KLOEPFER, JR 2,807,482
MECHANICAL SEAL
Filed June 6, 1955 3 Sheets-Sheet 1

INVENTOR.
RICHARD W. KLOEPFER, JR.
BY
Clark & Ott
ATTORNEYS

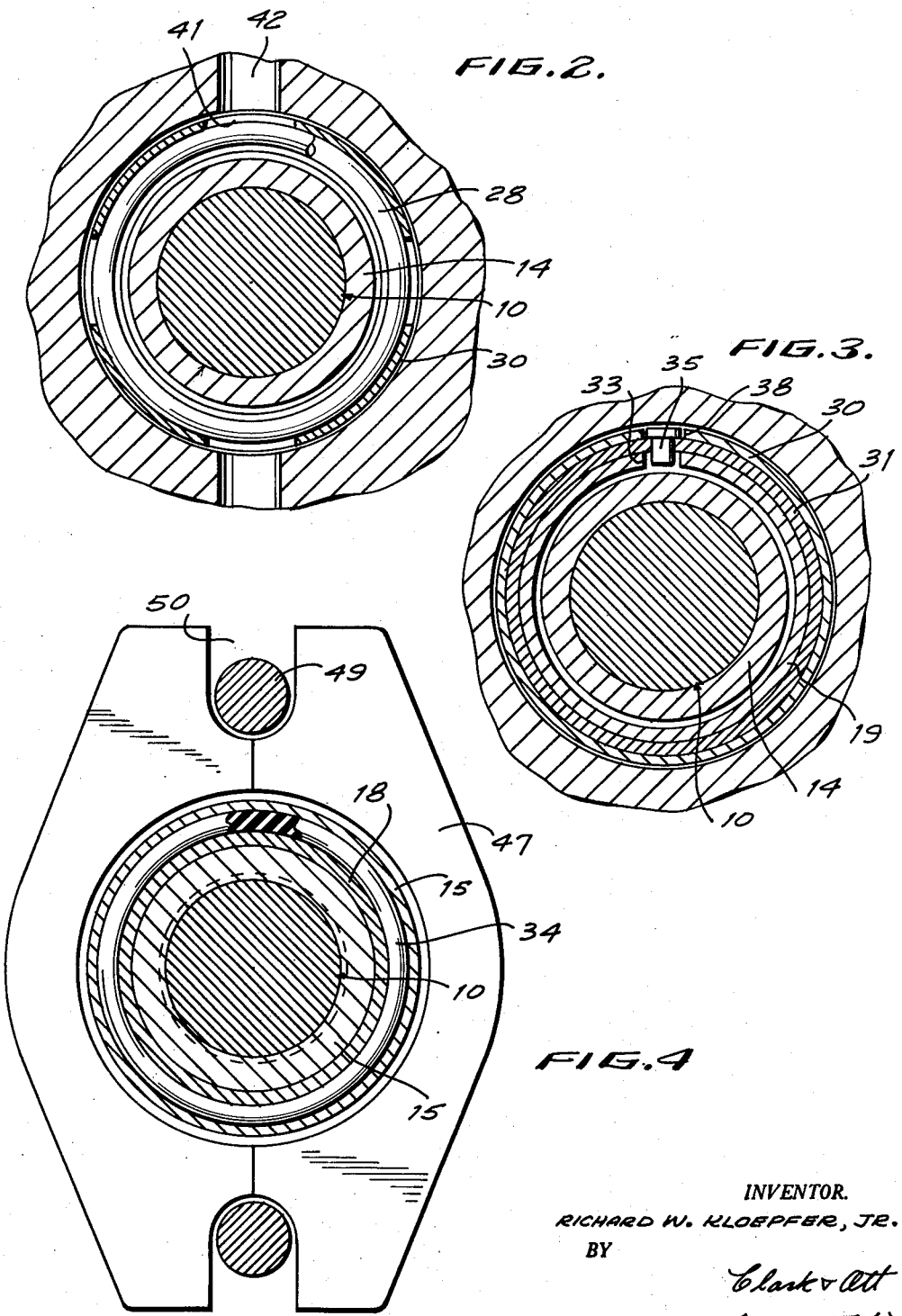

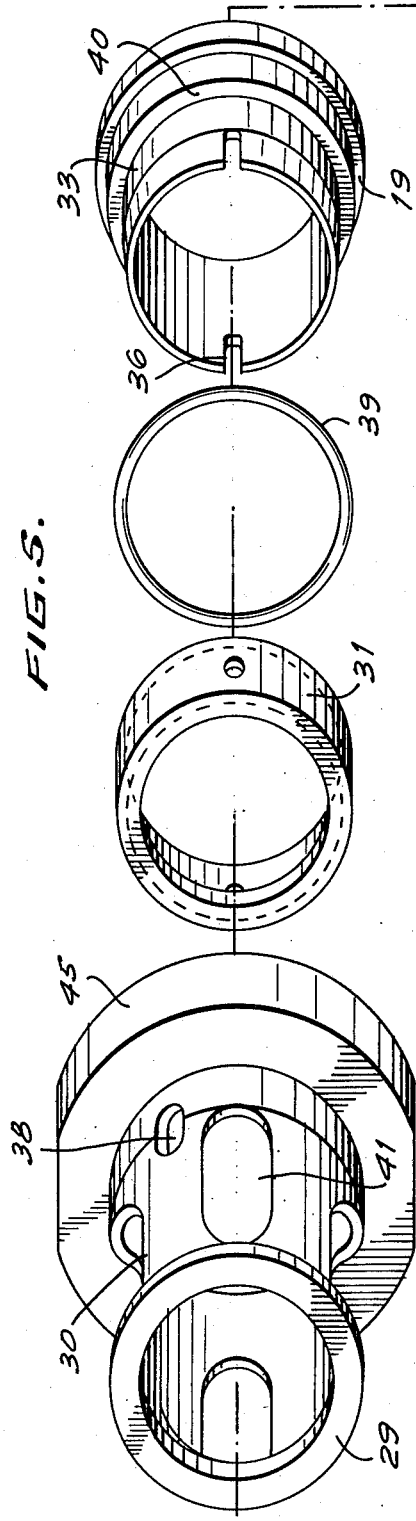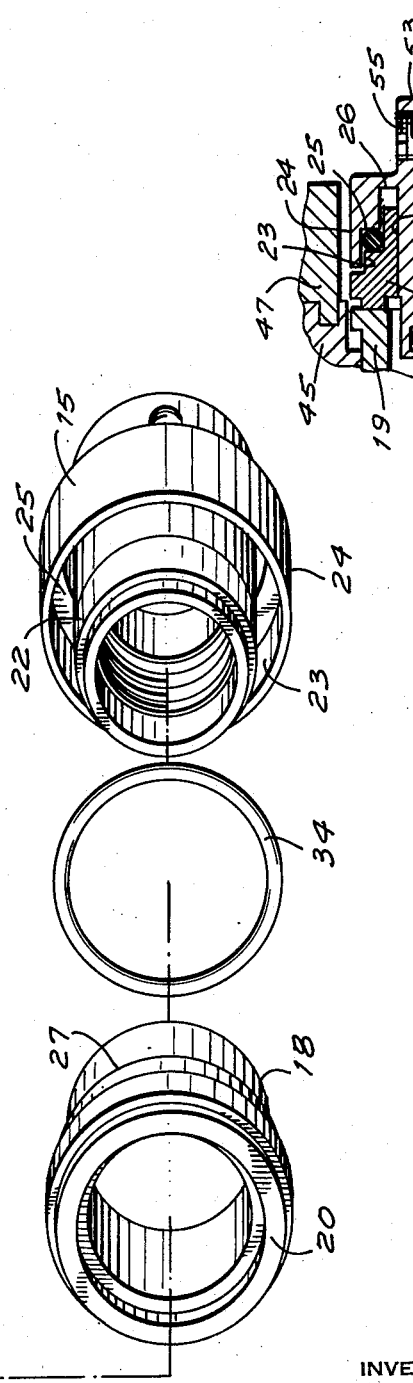

United States Patent Office 2,807,482
Patented Sept. 24, 1957

2,807,482

MECHANICAL SEAL

Richard W. Kloepfer, Jr., Saddle River, N. J.

Application June 6, 1955, Serial No. 513,186

4 Claims. (Cl. 286—11.14)

This invention relates to mechanical seals for relative rotating parts and the invention has particular reference to a mechanical seal between a rotating shaft and a housing wall to prevent the escape of fluid along the shaft.

Mechanical seals include coacting sealing members, one of which rotates with the shaft and the other is fixed against rotation but is free to move axially of the shaft and is tensioned by a spring disposed in surrounding relation with the shaft for maintaining the coacting sealing members in tensioned engagement. This construction has necessitated the provision of a shoulder on the rotating shaft against which the spring seats in order to maintain the spring tensioned against the sealing members. The machining of the rotating shaft to provide the shoulder has increased the cost of mechanical seals particularly in the conversion of packing gland shafts to shafts adapted for mechanical seals. In addition thereto, the arrangement of the spring against the shoulder of the rotating shaft causes the spring to rotate with the shaft so as to impart centrifugal force to the spring, thus tending to distort the same. In order to overcome the aforesaid objections, the invention comprehends the use of a shell between the shaft and housing wall which is fixed with reference to the housing and provides an abutment for the spring which is tensioned against the sealing members located on the protruding end of the shaft.

Another object of the invention is to provide a mechanical seal in which one of the coacting sealing members and the lock nut affixed to the shaft are the only rotating parts thereof.

Still another object of the invention is to provide a mechanical seal in which the spring provides an equalized pressure at all times on the coacting sealing members irrespective of the speed of rotation of the shaft.

Still another object of the invention is to provide a mechanical seal in which the seal assembly may be conveniently inserted between the shaft and housing without dismantling the housing or shaft whereby repairs and replacements may be conveniently made.

With the above and other objects in view, the invention also consists of novel features of construction and arrangement of parts to be hereinafter described and more particularly pointed out.

In the drawings:

Fig. 2 is a vertical sectional view taken approximately on line 2—2 of Fig. 1.

Fig. 3 is a vertical sectional view taken approximately on line 3—3 of Fig. 1.

Fig. 4 is a vertical sectional view taken approximately on line 4—4 of Fig. 1.

Fig. 5 is an enlarged perspective view of the parts of the mechanical seal with the same shown in separated juxtaposition.

Fig. 6 is a fragmentary sectional view of the shaft showing a modified form of locking nut.

Figure 1:
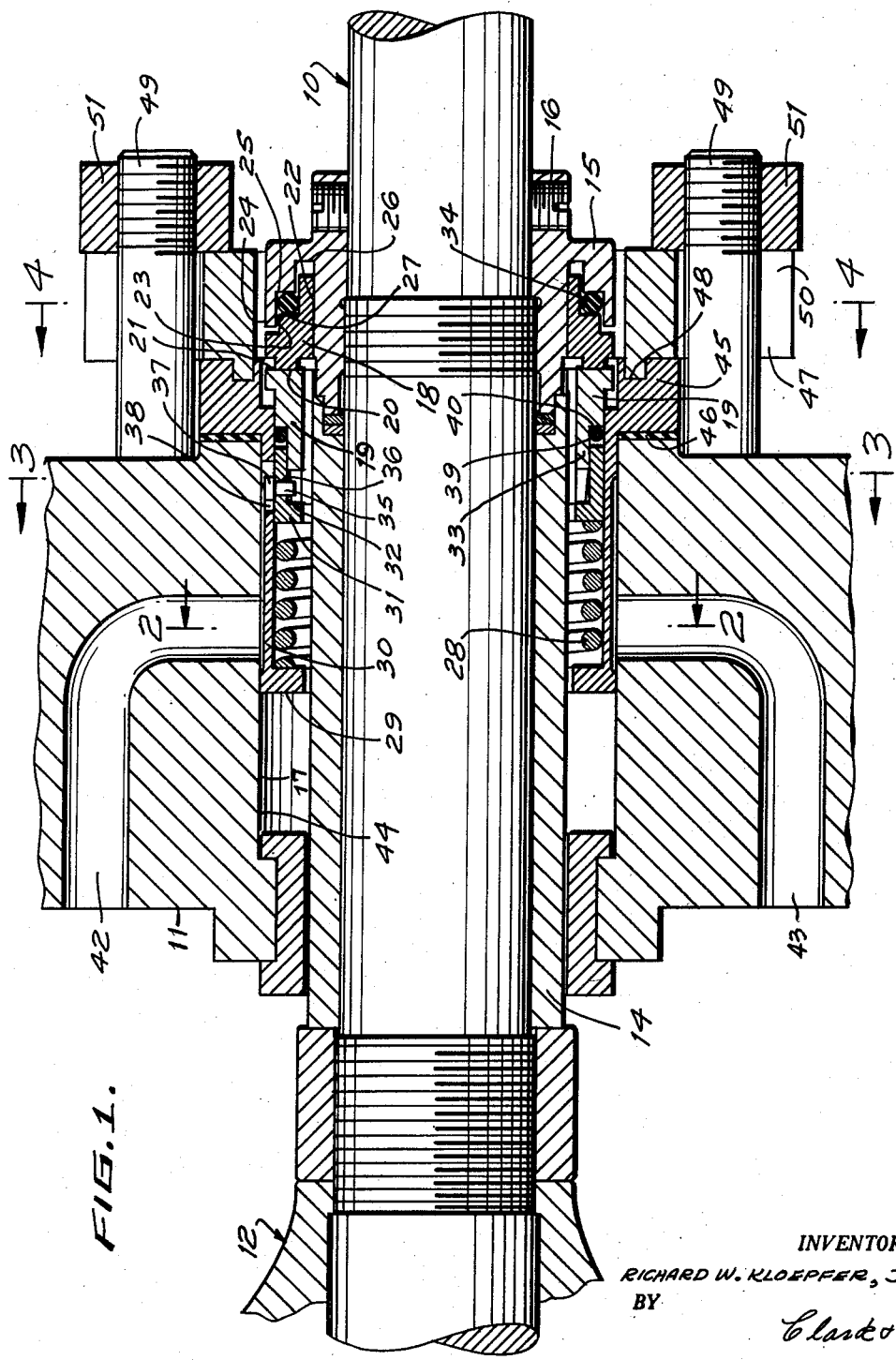
Fig. 1 is a vertical sectional view of a mechanical seal constructed in accordance with the invention.

Referring to the drawings, the shaft 10 of a centrifugal pump and the like is suitably mounted for rotation on bearings (not shown) with the shaft protruding from the housing 11 of the pump and connected with the impeller 12 thereof within the housing. Arranged on the shaft 10 is a sleeve 14 disposed between the impeller 12 and a lock nut 15 which is threaded onto the shaft and secured thereon by set screws 16.

The shaft is sealed between the sleeve 14 and the inner periphery 17 of the housing 11 by coacting sealing members 18 and 19 having coacting annular faces 20 and 21 which prevent leakage of fluid therebetween. The sealing members are arranged in concentric relation about the shaft with the sealing member 18 surrounding and slidably fitting the peripheral face 22 of the lock nut 15 and with the sealing member 19 disposed in spaced relation with the confronting end portions of the sleeve 14 and the lock nut 15. The lock nut 15 is formed with an annular recess 23 which opens through the inner face thereof and provides the peripheral face 22, an inwardly directed peripheral flange 24, and peripheral stepped faces 25 and 26 between the peripheral face 22 and the flange 24.

The sealing member 18 is shaped to slidably fit the recess 23 and between the shoulder 27 thereof and the face 25 of the lock nut an O-ring 34 is interposed to prevent the flow of fluid between the lock nut and the sealing member 18. The sealing members 18 and 19 are disposed in tensioned engagement by means of a coil spring 28 surrounding the sleeve 14 and interposed between the inwardly directed inner end 29 of a cylindrical shell 30 and a back up ring 31. The back up ring 31 is located within the cylindrical shell 30 and is rabbeted on its inner periphery as at 32 to slidably engage over the reduced inner end 33 of the sealing member 19. Secured in an opening in the back up ring 31 is a pin 35 which is arranged with the inner end thereof protruding therethrough and into a U-shaped slot 36 in the inner edge of the sealing member 19. The head 37 of the pin 35 is slidable in a slot 38 in the cylindrical shell 30. The pin 35 prevents rotation of the sealing member 19 but permits movement thereof axially of the shaft with the coacting member 18 to compensate for end play in either direction. An O-ring 39 is interposed between the outer end of the back up ring 31 and a shoulder 40 of the sealing member 19 to prevent flow of the fluid between the inner periphery of the cylindrical shell 30 and the sealing member 19.

The back up ring 31 is adapted to seat against the inner annular edge of the sealing member 19 whereby sufficient space is provided for the O-ring 39 so that the same is not squeezed between the back up ring and the sealing member 19, and the sealing thereof is effected by the pressure of the fluid thereagainst.

The U-shaped slot 36 in the sealing member 19 permits of the convenient insertion and replacement thereof without disassembling the remaining parts of the seal.

The cylindrical shell 30 is provided with a plurality of circumferentially spaced openings 41 which are located inwardly of passageways 42 and 43 in the housing 11 and open into the interior housing for the circulation of fluid from the interior of the housing about the sleeve 14 and thence returned to the housing through the said passageways 42 and 43. The cylindrical shell 30 slidably fits the cylindrical wall 44 defining the opening in the housing 11 through which the shaft 10 protrudes and is formed with a peripheral flange 45 at its outer end which overlies a portion of the outer face of the housing 11. A gasket 46 is interposed between the flange 45 and the housing and the flange is tightened thereagainst by means of a split gland 47 having an annular bead on the inner face thereof which is adapted to fit the annular recesses 48 in the outer face of the flange 45. Bolts 49 protrude through the recesses 50 in the split glands and are engaged by nuts 51 by tightening the gland and the flange 45 of the cylindrical shell 30 against the housing 11.

The annular faces 20 and 21 of the sealing members are smooth, lapped surfaces for close fitting engagement. One of the coacting sealing members is of relatively harder material than the other. For instance, the sealing member 18 may be made of carbon, cast iron or ceramics and the like, while the sealing member 19 may be made of stainless steel with a stellite face 21 or any other hard material.

In some pump installations the shaft is not provided with a sleeve between the impeller and the lock nut. In such installations, the lock nut 53 is employed as shown in Fig. 6 of the drawings. In the use of the lock nut 53, the shaft 10 is provided with an annular groove 54 and the lock nut has set screws 55 provided with conical shaped inner ends which engage in the groove 54 for retaining the lock nut in position. The lock nut 53 is otherwise similar in construction to the lock nut 15 and is provided with a peripheral face 22 and with an annular recess 23 with stepped faces 25 and 26 between the peripheral face 22 and the flange 24 as in the lock nut 15.

Constructed in this manner, there is provided a balanced mechanical seal which may be applied to a shaft of a centrifugal pump and the like without removing the shaft and the seal may be conveniently and expeditiously removed therefrom for repairs or replacements without dismantling the pump. The spring 28, the cylindrical shell 30, the back up ring 31 and the sealing member 19 do not have rotary movement with the shaft whereby equalized pressure at all times is maintained on the coacting sealing members irrespective of the speed of rotation of the shaft.

While the preferred form of the invention is shown and described herein, it is to be understood that the same is not so limited but shall cover and include any and all modifications of the invention which fall within the purview thereof.

What is claimed is:

1. In a fluid seal for a rotating shaft and a housing wall having an opening through which the shaft protrudes, a member secured to the shaft in surrounding relation therewith and having an annular recess in the inner face thereof providing an annular face extending axially of the shaft, inner and outer sealing members surrounding the shaft and having smooth coacting sealing faces, said outer sealing member slidably fitting said annular face, a resilient sealing member arranged in said recess between said outer sealing member and said first mentioned member providing a fluid seal therebetween, a tubular shell surrounding said shaft and secured in said opening in the housing wall, said tubular shell having an inturned inner end, a back up ring surrounding said shaft and engaged over the inner end of said inner sealing member, spring means arranged between the inturned inner end of said tubular shell and said back up ring tensioning said inner sealing member against said outer sealing member, said inner sealing member and said shell having registering openings, and means carried by said back up ring extending into the registering openings in the tubular shell and inner sealing member whereby the inner sealing member is retained against rotation and the back up ring and inner sealing member have movement axially of the shaft.

2. In a fluid seal for a rotating shaft and a housing wall having an opening through which the shaft protrudes, a member secured to the shaft in surrounding relation therewith and having an annular recess in the inner face thereof providing an annular face extending axially of the shaft, inner and outer sealing members surrounding the shaft and having smooth coacting sealing faces, said outer sealing member slidably fitting said annular face, a resilient sealing member arranged in said recess between said outer sealing member and said first mentioned member providing a fluid seal therebetween, a tubular shell surrounding said shaft and secured in said opening in the housing wall, said tubular shell having an inturned inner end, a back up ring surrounding said shaft and engaged over the inner end of said inner sealing member, spring means arranged between the inturned inner end of said tubular shell and said back up ring tensioning said inner sealing member against said outer sealing member, a resilient sealing member arranged in surrounding relation with said inner sealing member providing a fluid seal between said inner sealing member and said tubular shell, said inner sealing member and said tubular shell having registering openings, and means carried by said back up ring extending into the registering openings in the tubular shell and inner sealing member whereby the inner sealing member is retained against rotation and the back up ring and inner sealing member have movement axially of the shaft.

3. In a fluid seal for a rotating shaft and a housing wall having an opening through which the shaft protrudes, a member secured in surrounding relation with said shaft and having an annular recess in the inner face thereof providing an annular face extending axially of the shaft, inner and outer sealing members surrounding the shaft and having smooth coacting sealing faces, said outer sealing member slidably fitting said annular face, a resilient sealing member arranged in said recess between said outer sealing member and said first mentioned member providing a fluid seal therebetween, a tubular shell surrounding said shaft and secured in said opening in the housing wall, said tubular shell having an inner end, a back up ring surrounding said shaft engaging over the inner end of said inner sealing member, spring means arranged between the inner end of said tubular shell and said back up ring tensioning said inner sealing member against said outer sealing member, and means engaging between said back up ring and said inner sealing member to limit relative movement of these last two parts with respect to each other to axial movement.

4. In a fluid seal for a rotating shaft and a housing wall having an opening through which the shaft protrudes, a member secured in surrounding relation with said shaft and having an annular recess in the inner face thereof providing an annular face extending axially of the shaft, inner and outer sealing members surrounding the shaft and having smooth coacting sealing faces, said outer sealing member slidably fitting said annular face, a resilient sealing member arranged in said recess between said outer sealing member and said first mentioned member providing a fluid seal therebetween and spacing the outer end of said outer sealing member from said annular recess whereby said outer sealing member has movement toward and away from said annular recess with the resiliency of said sealing member, a tubular shell surrounding said shaft and secured in said opening in the housing wall, said tubular shell having an inner end, a back up ring surrounding said shaft engaging over the inner end of said inner sealing member, spring means arranged between the inner end of said tubular shell and said back up ring tensioning said inner sealing member against said outer sealing member, and means engaging between said back up ring and said inner sealing member to limit relative movement of these last two parts with respect to each other to axial movement.

References Cited in the file of this patent

UNITED STATES PATENTS

| 1,097,074 | Bennett | May 19, 1914 |
| 2,112,461 | Kohler | Mar. 29, 1938 |
| 2,687,096 | Armacost | Aug. 24, 1954 |

FOREIGN PATENTS

| 506,524 | Great Britain | May 30, 1939 |